(12) United States Patent
Fernandez et al.

(10) Patent No.: US 12,233,574 B2
(45) Date of Patent: Feb. 25, 2025

(54) CONCRETE TRANSPORT VEHICLE WITH DRUM LIFT APPARATUS

(71) Applicant: Putzmeister Engineering GmbH, Aichtal (DE)

(72) Inventors: Emiliano Fernandez, Madrid (ES); Jose Antonio Nieto, Madrid (ES); Ivan Varela, Madrid (ES)

(73) Assignee: Putzmeister Engineering GmbH, Aichtal (DE)

( * ) Notice: Subject to any disclaimer, the term of this patent is extended or adjusted under 35 U.S.C. 154(b) by 852 days.

(21) Appl. No.: 17/274,078

(22) PCT Filed: Aug. 15, 2019

(86) PCT No.: PCT/EP2019/071976
§ 371 (c)(1),
(2) Date: Mar. 5, 2021

(87) PCT Pub. No.: WO2020/048755
PCT Pub. Date: Mar. 12, 2020

(65) Prior Publication Data
US 2021/0308904 A1   Oct. 7, 2021

(30) Foreign Application Priority Data
Sep. 6, 2018   (EP) ..................... 18382644

(51) Int. Cl.
*B28C 5/42*   (2006.01)
*B60P 3/16*   (2006.01)

(52) U.S. Cl.
CPC .......... *B28C 5/4272* (2013.01); *B28C 5/4237* (2013.01); *B28C 5/4244* (2013.01); *B60P 3/16* (2013.01)

(58) Field of Classification Search
CPC ... B28C 5/4272; B28C 5/4237; B28C 5/4244; B28C 5/4275; B60P 3/16
(Continued)

(56) References Cited

U.S. PATENT DOCUMENTS 1,659,750 A * 2/1928 Stollings ............... B28C 5/4275
366/12
1,780,956 A * 11/1930 Totten .................. B28C 5/4275
366/45
(Continued)

FOREIGN PATENT DOCUMENTS

AU      2015201768 A1   10/2015
CN      2426864 Y       4/2001
(Continued)

OTHER PUBLICATIONS

Chinese-language Office Action issued in Chinese Application No. 201980058245.0 dated Jul. 25, 2022 (eight (8) pages).
(Continued)

*Primary Examiner* — Charles Cooley
(74) *Attorney, Agent, or Firm* — Crowell & Moring LLP

(57) ABSTRACT

A concrete transport vehicle has a vehicle chassis, a concrete drum unit and a drum lift apparatus. The vehicle chassis carries the concrete drum unit and the drum lift apparatus. The concrete drum unit has a concrete drum, wherein the concrete drum is adapted to discharge concrete. The drum lift apparatus is adapted to lift the concrete drum unit with reference to the vehicle chassis from a transport position to a discharge position, wherein a vehicle height of the concrete transport vehicle is lowered in the transport position compared to the discharge position and wherein a drumrear and a drumfront of the concrete drum unit each is lifted in the discharge position compared to the transport position.

15 Claims, 2 Drawing Sheets

(58) Field of Classification Search
USPC .......................................................... 366/26
See application file for complete search history.

(56) References Cited

U.S. PATENT DOCUMENTS

| | | | | | |
|---|---|---|---|---|---|
| 1,919,073 | A | * | 7/1933 | Paris | B28C 5/4275 |
| | | | | | 366/45 |
| 1,926,624 | A | * | 9/1933 | Hoffmann | B28C 5/4275 |
| | | | | | 366/63 |
| 1,943,325 | A | * | 1/1934 | Knowles | B28C 5/4275 |
| | | | | | 251/294 |
| 2,013,359 | A | * | 9/1935 | Paris | B28C 5/4275 |
| | | | | | 366/45 |
| 2,063,574 | A | * | 12/1936 | Yett | B28C 5/4275 |
| | | | | | 74/665 GE |
| 2,533,362 | A | * | 12/1950 | Devine | B28C 5/4275 |
| | | | | | 366/62 |
| 3,131,913 | A | * | 5/1964 | Swarthout | B28C 5/4272 |
| | | | | | 298/7 |
| 3,175,811 | A | * | 3/1965 | Jackson | B28C 5/4272 |
| | | | | | 366/45 |
| 3,715,107 | A | * | 2/1973 | Paris | B28C 5/20 |
| | | | | | 366/6 |
| 4,243,328 | A | | 1/1981 | Prichard | |
| 4,461,577 | A | * | 7/1984 | Mechem | B60P 3/16 |
| | | | | | 366/63 |
| 5,137,366 | A | * | 8/1992 | Hill | B28C 5/4272 |
| | | | | | 192/69.82 |

FOREIGN PATENT DOCUMENTS

| | | | | | |
|---|---|---|---|---|---|
| CN | 101053980 | A | * | 10/2007 | ........... B28C 5/4272 |
| CN | 102874168 | A | | 1/2013 | |
| CN | 203210532 | U | | 9/2013 | |
| CN | 206493441 | U | | 9/2017 | |
| DE | 1 223 309 | B | | 8/1966 | |
| DE | 4020282 | A | * | 1/1992 | ........... B28C 5/4272 |
| EP | 3620328 | A1 | * | 3/2020 | ........... B28C 5/4237 |
| ES | 2 005 275 | A6 | | 3/1989 | |
| FR | 2872730 | A1 | * | 1/2006 | ........... B28C 5/1875 |
| GB | 715026 | | | 9/1954 | |
| GB | 1046892 | A | | 10/1966 | |
| GB | 1361373 | A | * | 7/1974 | ................ B60P 3/16 |
| GB | 2 139 160 | A | | 11/1984 | |
| JP | 57-109608 | A | | 7/1982 | |
| JP | 57-176116 | A | | 10/1982 | |
| JP | 58-38414 | U | | 3/1983 | |
| JP | 6110816 | U | | 1/1986 | |
| JP | 63-239006 | A | | 10/1988 | |
| JP | 4-95532 | U | | 8/1992 | |
| JP | 11-78666 | A | | 3/1999 | |
| JP | 2000-190322 | A | | 7/2000 | |
| WO | WO-9500358 | A1 | * | 1/1995 | ........... B28C 5/4272 |
| WO | WO 2008/131669 | | | 11/2008 | |

OTHER PUBLICATIONS

Japanese-language Office Action issued in Japanese Application No. 2021-5122610 dated Mar. 7, 2023 with English translation (eight (8) pages).

International Search Report (PCT/ISA/210) issued in PCT Application No. PCT/EP2019/071976 dated Dec. 12, 2019 (four (4) pages).

Extended European Search Report issued in European Application No. 18382644.5 dated Mar. 4, 2019 (eight (8) pages).

Written Opinion (PCT/ISA/237) issued in PCT Application No. PCT/EP2019/071976 dated Dec. 12, 2019 (five (5) pages).

Chinese Office Action issued in Chinese Application No. 201980058245.0 dated Feb. 20, 2023 (seven (7) pages).

Australian Office Action issued in Australian Application No. 2019334174 dated May 28, 2024 (3 pages).

* cited by examiner

CONCRETE TRANSPORT VEHICLE WITH DRUM LIFT APPARATUS

TECHNICAL FIELD AND PRIOR ART

The invention relates to a concrete transport vehicle.

SUMMARY OF THE INVENTION

It is the object of the invention to provide a concrete transport vehicle, wherein the concrete transport vehicle comprises improved properties.

This object is achieved by a concrete transport vehicle according to the independent claim. Preferred embodiments are defined in the dependent claims.

The invention relates to a concrete transport vehicle, in particular to a concrete mixing transport vehicle. The inventive concrete transport vehicle comprises a vehicle chassis, a concrete drum unit, in particular a concrete mixing drum unit, and a drum lift apparatus. The vehicle chassis carries the concrete drum unit and the drum lift apparatus. The concrete drum unit comprises a concrete drum, in particular a concrete mixing drum. The concrete drum is adapted or configured, respectively, to mix and, to, in particular automatically, discharge concrete. The drum lift apparatus is adapted or configured, respectively, to, in particular automatically, lift or raise or elevate or displace, respectively, the, in particular whole, concrete drum unit, in particular the whole concrete drum, with reference to the vehicle chassis from a transport position to a discharge position, in particular upwards and/or in a vertical direction. A vehicle height, in particular a value of the vehicle height, of the concrete transport vehicle is lowered or decreased or lower, respectively, in the transport position compared to the discharge position. Furthermore, a drumrear and a drumfront of the concrete drum unit each is lifted or increased or higher or elevated, respectively, in the discharge position compared to the transport position, in particular with reference to the vehicle chassis.

The transport position enables to move or drive, respectively, the concrete transport vehicle through a tunnel of a relatively low or restricted height, in particular to a construction site. The discharge position enables to discharge the concrete onto or to feed, respectively, a hopper, in particular of a spraying machine, of a relatively large height, in particular at a, in particular the, construction site of a relatively large height. In particular the discharge position enables to avoid an, in particular mechanical, interference between the concrete drum unit, in particular a swivel chute of the concrete drum unit, and an external object, in particular a, in particular the, spraying machine, during discharging. Furthermore, the discharge position allows a better access to systems of the concrete transport vehicle placed bellow the concrete drum unit, in particular the concrete drum, and an easier maintenance operation.

In particular the vehicle chassis may be denoted as vehicle frame.

Additionally or alternatively the drum lift apparatus may be denoted as drum lift device. Additionally or alternatively the drum lift apparatus may be adapted to lower the concrete drum unit with reference to the vehicle chassis from the discharge position to the transport position, in particular downwards and/or in a vertical direction. Additionally or alternatively the drum lift apparatus may be adapted to move, in particular to lift and/or to lower, the concrete drum unit translationally, in particular only translationally and not rotationally.

Additionally or alternatively the discharge position may be denoted as working position. Additionally or alternatively the discharge position may be different from the transport position.

Additionally or alternatively the vehicle height may be defined or restricted, respectively, by the concrete drum unit, in particular by the concrete drum. Additionally or alternatively the vehicle height may be lifted in the discharge position compared to the transport position.

Additionally or alternatively the drumrear may be defined by a rear end of the concrete drum unit. Additionally or alternatively the drumfront may be defined by a front end of the concrete drum unit. Additionally or alternatively the drumrear may be positioned rearward compared to the drumfront, in particular with reference to the vehicle chassis. Additionally or alternatively the drumfront may be spatially closer, in particular positioned, to a front end of the concrete transport vehicle, in particular a driver's cab in case of a concrete transport truck or a trailer coupling in case of a concrete transport trailer, compared to the drumrear. Additionally or alternatively the drumrear and the drumfront may be lifted in parallel or by the same value. Additionally or alternatively the drumrear and the drumfront each may be lowered in the transport position compared to the discharge position, in particular with reference to the vehicle chassis.

Additionally or alternatively the concrete transport vehicle may comprise an user-operable control device, in particular being adapted to control the drum lift apparatus, in particular to control the transport position and the discharge position.

According to an embodiment of the invention the concrete drum comprises an opening, in particular arranged, at the drumrear. The opening is adapted or configured, respectively, for discharging concrete out of the concrete drum, and in particular for charging concrete into the concrete drum. In particular the concrete drum may not or does not have to be a reversible type concrete drum. Additionally or alternatively the opening may be open not only in the discharge position, but also in the transport position. In other words: the opening may not or does not have to be adapted to be closed, in particular hermetically.

According to an embodiment of the invention a longitudinal axis of the concrete drum is inclined, in particular with reference to the horizontal direction, in particular in the discharge position and in the transport position. This may enable the opening to be open not only in the discharge position, but also in the transport position. Formulated differently: an inclination angle, in particular a value of the inclination angle, between the longitudinal axis and the horizontal direction may be different from zero. In particular the inclination angle may not be changed to zero. Formulated differently: the drum lift apparatus may not or does not have to be adapted to move the concrete drum to a horizontal position or the longitudinal axis to the horizontal direction, respectively. In particular the inclination angle may be unchanged in the discharge position and in the transport position. In other words: the drum lift apparatus may not or does not have to be adapted to change the inclination angle. Additionally or alternatively a rear end of the concrete drum may be lifted compared to a front end of the concrete drum.

According to an embodiment of the invention the drumrear is positioned rearward, in particular in the horizontal direction, in the discharge position compared to the transport position, in particular with reference to the vehicle chassis, in particular rearward of or beyond, respectively, a chassisrear or a rear end, respectively, of the vehicle chassis. This, in particular the discharge position, enables to avoid an, in particular mechanical, interference between the concrete drum unit, in particular a, in particular the, swivel chute of the concrete drum unit, and/or the vehicle chassis and an external object, in particular a, in particular the, spraying machine, during discharging. In particular the drum lift apparatus may be adapted to displace or to move, respectively, the concrete drum unit with reference to the vehicle chassis from the transport position to the discharge position, in particular rearwards and/or in the horizontal direction, and/or from the discharge position to the transport position, in particular frontwards and/or in the horizontal direction, in particular translationally, in particular only translationally and not rotationally. In particular the drum lift apparatus may be adapted to lift and to displace rearwards the concrete drum unit at the same time. Additionally or alternatively the drum lift apparatus may be adapted to lower and to displace frontwards the concrete drum unit at the same time.

Additionally or alternatively the drumfront may be positioned rearward in the discharge position compared to the transport position, in particular with reference to the vehicle chassis.

According to an embodiment of the invention the drum lift apparatus comprises a rearlift apparatus and a frontlift apparatus. The rearlift apparatus and the frontlift apparatus each is adapted or configured, respectively, to, in particular automatically, lift, and in particular to lower, at least a part of the concrete drum unit, in particular the whole or complete, respectively, concrete drum unit, with reference to the vehicle chassis, in particular upwards and/or downwards and/or in a vertical direction. Furthermore, the rearlift apparatus is positioned rearward compared to the frontlift apparatus, in particular with reference to the vehicle chassis, in particular in the horizontal direction. This enables a force distribution. In particular the rearlift apparatus may be adapted to lift, and in particular to lower, the concrete drum unit at the drumrear. Additionally or alternatively the frontlift apparatus may be adapted to lift, and in particular to lower, the concrete drum unit at the drumfront. Additionally or alternatively the frontlift apparatus may be different from the rearlift apparatus.

According to an embodiment of the invention the drum lift apparatus comprises at least one mechanical link. The mechanical link is adapted or configured, respectively, to lift, and in particular to lower, at least a part of the concrete drum unit, in particular the whole or complete, respectively, concrete drum unit, with reference to the vehicle chassis, in particular upwards and/or downwards and/or in a vertical direction. In particular the drum lift apparatus may comprise a rearlift mechanical link being adapted to lift, and in particular to lower, at least a part of the concrete drum at the drumrear. Additionally or alternatively the drum lift apparatus may comprise a frontlift mechanical link being adapted to lift, and in particular to lower, at least a part of the concrete drum at the drumfront. In particular the rearlift mechanical link, if present, may be positioned rearward compared to the frontlift mechanical link, if present, in particular with reference to the vehicle chassis, in particular in the horizontal direction. Additionally or alternatively the frontlift mechanical link may be different from the rearlift mechanical link. Additionally or alternatively the at least one mechanical link may be connected, in particular joined, in particular revolute or hinged joined, to the vehicle chassis and/or the concrete drum unit, in particular at the drumrear and/or at the drumfront. Additionally or alternatively the at least one mechanical link may be rigid.

According to an embodiment of the invention the vehicle chassis, the rearlift apparatus or mechanical link, respectively, a part of the concrete drum unit, in particular a platform of the concrete drum unit, and the frontlift apparatus or mechanical link, respectively, form a four-bar linkage. This, in particular the four-bar linkage, enables to lift and to displace rearwards the concrete drum unit at the same time and/or to lower and to displace frontwards the concrete drum unit at the same time. In particular the vehicle chassis may be denoted as ground or frame. Additionally or alternatively the rearlift apparatus or mechanical link, respectively, and the frontlift apparatus or mechanical link, respectively, each may be denoted as lever or crank. Additionally or alternatively the part of the concrete drum unit, in particular the platform, may be denoted as rod or coupler. In particular the four-bar linkage may be denoted as planar and/or, in particular convex, quadrilateral four-bar linkage.

According to an embodiment of the invention the drum lift apparatus comprises at least one actuator, in particular a least one hydraulic cylinder. The at least one actuator is adapted or configured, respectively, to, in particular automatically, move at least a part of the concrete drum unit, in particular the whole or complete, respectively, concrete drum unit, with reference to the vehicle chassis. In particular the at least one actuator may be connected, in particular joined, in particular revolute or hinged joined, to the vehicle chassis and/or the concrete drum unit, in particular at the drumfront. Additionally or alternatively the at least one actuator may be adapted to move the four-bar linkage, if present. Additionally or alternatively the user-operable control device, if present, may be adapted to control the at least one actuator.

According to an embodiment of the invention the concrete drum unit comprises a drum drive and/or a charging hopper and/or a discharging hopper and/or a, in particular the, swivel chute. In particular the drum drive may be adapted to rotate or to turn, respectively, the concrete drum. In particular the drum drive may comprise a motor, and in particular additionally a reducer. Additionally or alternatively the drum drive may define the drumfront. Additionally or alternatively the charging hopper and/or the discharging hopper and/or the swivel chute may define the drumrear. Additionally or alternatively at least a part of the swivel chute may be adjustable in height, in particular in the vertical direction, and/or in length, in particular in the horizontal direction, in particular in the discharge position and/or in the transport position. However, this may not or does not have to offer the advantage/s of the drum lift apparatus and the concrete drum unit as described above.

According to an embodiment of the invention the concrete drum unit comprises a, in particular the, platform. The platform carries the concrete drum and/or the drum drive, if present, and/or the charging hopper, if present, and/or the discharging hopper, if present, and/or the swivel chute, if present. The drum lift apparatus is adapted or configured, respectively, to, in particular automatically, lift the platform with reference to the vehicle chassis from the transport position to the discharge position.

According to an embodiment of the invention the concrete drum is a revolving or bidirectional rotating, respectively, concrete drum. This may enable to maintain the concrete's liquid state until delivery or discharge, respectively. In particular an interior of the concrete drum may be fitted with a spiral blade. In particular in one rotational direction, the concrete may be pushed deeper into the concrete drum. This may be the rotational direction the concrete drum may be rotated while the concrete may be transported to a, in particular the, construction site. When the concrete drum may rotate in the other rotational direction, the Archimedes' screw-type arrangement discharges or forces, respectively, the concrete out of the concrete drum, in particular through the opening, if present. From there it may go onto the discharging hopper and/or to the swivel chute, if present, to guide the, in particular viscous, concrete. Additionally or alternatively the concrete drum may not or does not have to be a reversible type concrete drum.

According to an embodiment of the invention the vehicle height is lowered in the transport position at least 10 centimeters (cm), in particular at least 25 cm, in particular 40 cm, compared to the discharge position. Additionally or alternatively the vehicle height is in the transport position in a range from 210 cm to 240 cm, in particular 225 cm, and/or in the discharge position in a range from 240 cm to 270 cm, in particular 260 cm. Additionally or alternatively the drum rear and/or the drumfront are/is lifted in the discharge position at least 10 cm, in particular at least 25 cm, in particular 40 cm, compared to the transport position. Additionally or alternatively an, in particular the, inclination angle of the concrete drum is in a range from 10 degrees (°) to 25°, in particular 16°. Additionally or alternatively the drumrear is positioned rearward in the discharge position at least 10 cm, in particular at least 25 cm, in particular 40 cm, compared to the transport position. Additionally or alternatively a drum volume of the concrete drum is in a range from 1 cubic meter ($m^3$), in particular from 2 $m^3$, to 6 $m^3$, in particular to 4.5 $m^3$, in particular 3 $m^3$.

According to an embodiment of the invention the concrete transport vehicle comprises wheels. The wheels carry the vehicle chassis.

According to an embodiment of the invention the concrete transport vehicle is a, in particular the, concrete transport truck. In particular the concrete transport truck may comprise a drive engine or a drive motor, in particular being adapted to drive at least some of the wheels, if present.

According to an embodiment of the invention the concrete transport vehicle is a mine vehicle.

BRIEF DESCRIPTION OF THE DRAWINGS

In the following, an embodiment of the invention will be described in detail with reference to the drawings. Throughout the drawings, the same elements will be denoted by the same reference numerals.

DETAILED DESCRIPTION OF EMBODIMENTS OF THE INVENTION

Figure 1:
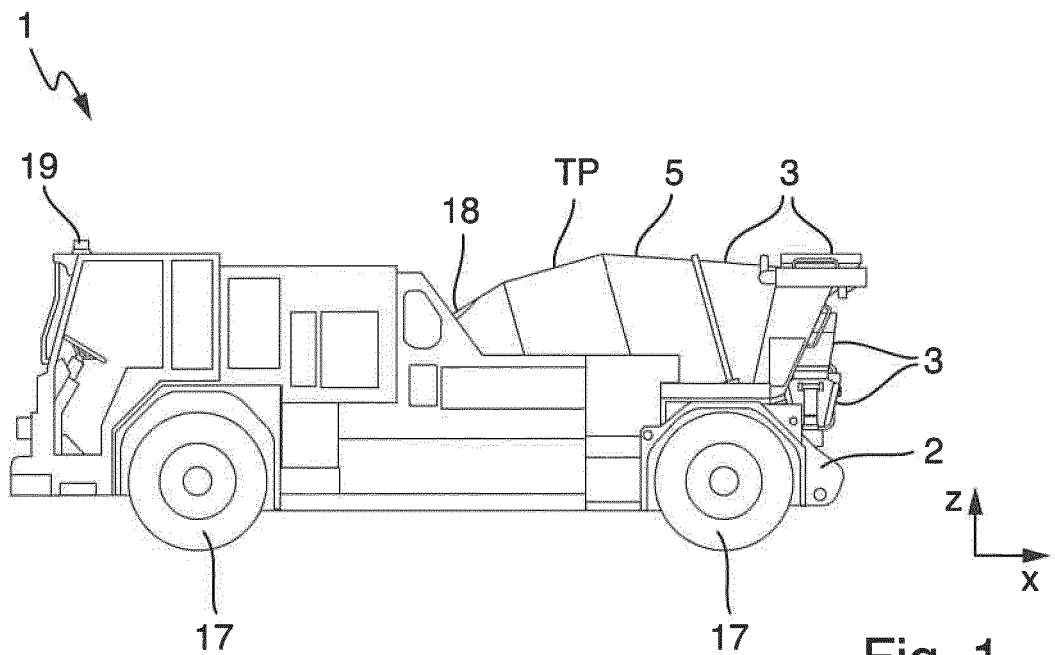
FIG. 1 schematically shows a side view of a concrete transport vehicle according to the invention with a concrete drum unit in a transport position, FIG. 2 schematically shows a side view of the concrete transport vehicle of FIG. 1 with the concrete drum unit in a discharge position, FIG. 3 schematically shows a longitudinal section view of the concrete transport vehicle of FIG. 1 with the concrete drum unit lowered by a drum lift apparatus in the transport position, and FIG. 4 schematically shows a longitudinal section view of the concrete transport vehicle of FIG. 1 with the concrete drum unit lifted by the drum lift apparatus in the discharge position.
Figure 2:
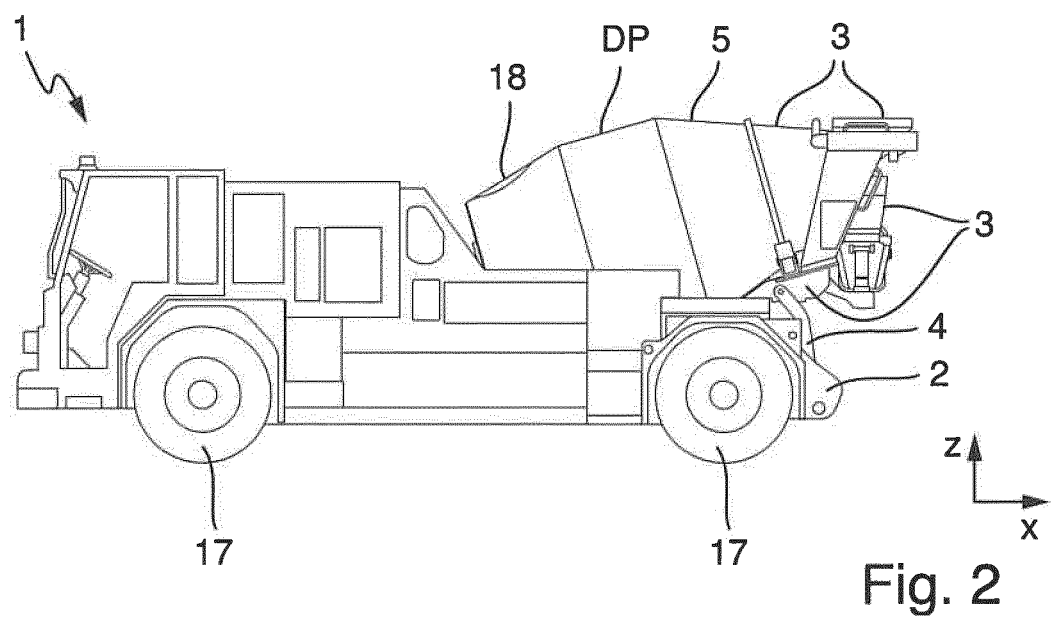
Figure 3:
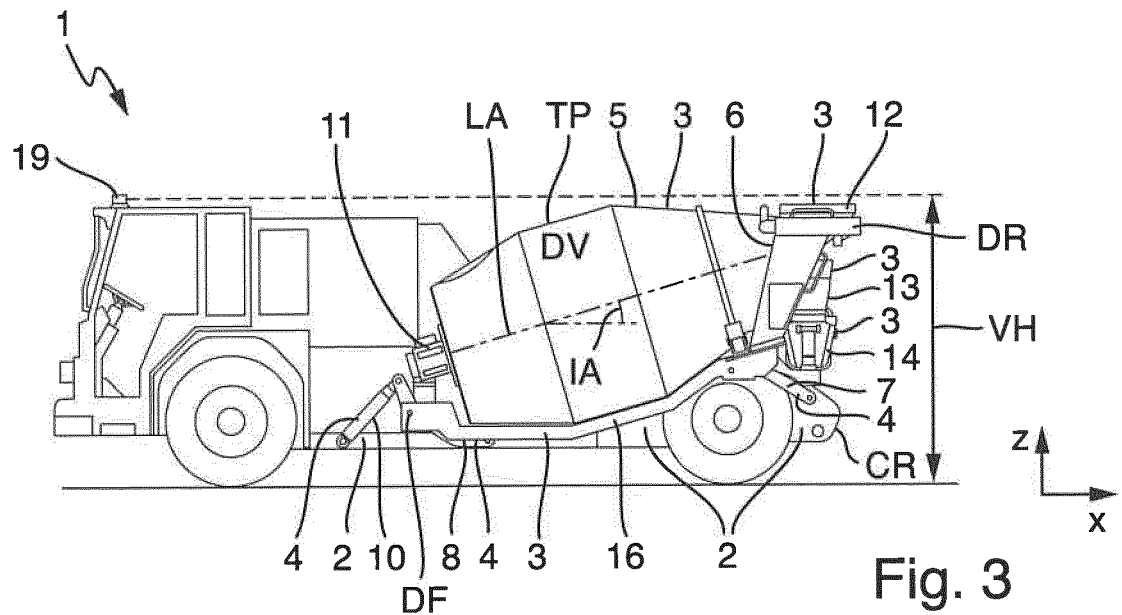
Figure 4:
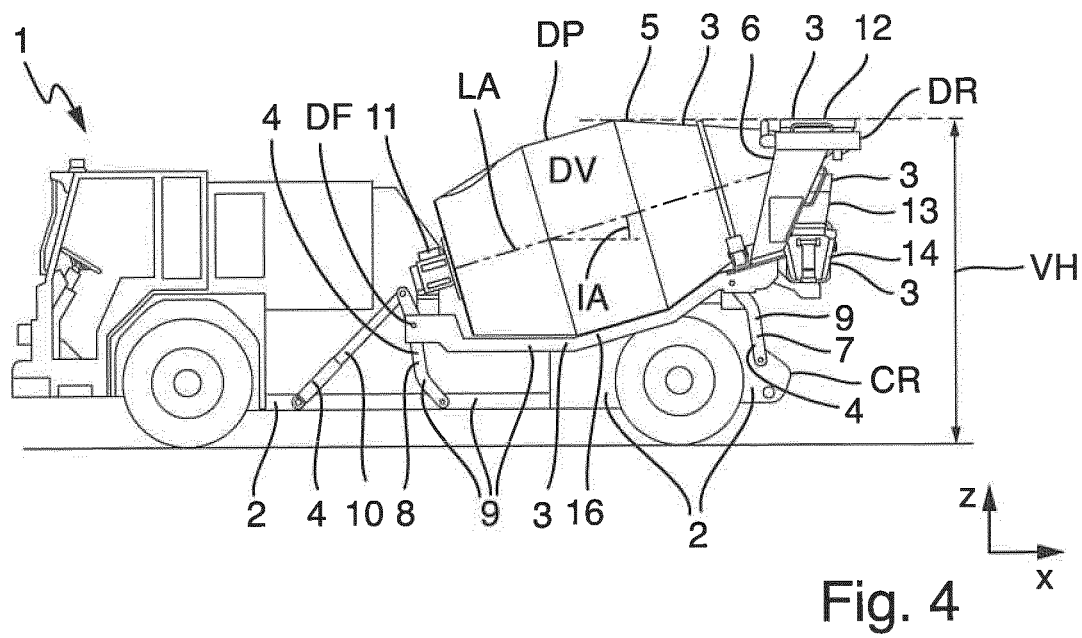

FIGS. 1 to 4 show an inventive concrete transport vehicle 1. The concrete transport vehicle 1 comprises a vehicle chassis 2, a concrete drum unit 3 and a drum lift apparatus. 4 The vehicle chassis 2 carries the concrete drum unit 3 and the drum lift apparatus 4. The concrete drum unit 3 comprises a concrete drum 5. The concrete drum 5 is adapted, in particular to mix and, to discharge concrete. The drum lift apparatus 4 is adapted to lift the concrete drum unit 3 with reference to the vehicle chassis 2 from a transport position TP to a discharge position DP, in FIGS. 1 to 4 upwards and/or in a vertical direction z. A vehicle height VH, in FIGS. 1 to 4 in the vertical direction z, of the concrete transport vehicle 1 is lowered in the transport position TP compared to the discharge position DP. Furthermore, a drumrear DR and a drumfront DF of the concrete drum unit 3 each is lifted in the discharge position DP compared to the transport position TP, in FIGS. 1 to 4 in the vertical direction z, in particular with reference to the vehicle chassis 2.

Moreover, the drum lift apparatus 4 is adapted to lower the concrete drum unit 3 with reference to the vehicle chassis 2 from the discharge position DP to the transport position TP, in FIGS. 1 to 4 downwards.

Further, the vehicle height VH is lifted in the discharge position DP compared to the transport position TP.

Furthermore, the drumrear DR and the drumfront DF each is lowered in the transport position TP compared to the discharge position DP.

Moreover, the concrete drum 5 comprises an opening 6 at the drumrear DR. The opening 6 is adapted for discharging concrete out of the concrete drum 5, and in particular for charging concrete into the concrete drum 5.

In the shown embodiment the concrete drum 5 additionally comprises a manway opening 18.

Further, a longitudinal axis LA of the concrete drum 5 is inclined, in FIGS. 1 to 4 with reference to the horizontal direction x, in particular in the discharge position DP and in the transport position TP.

Furthermore, the drumrear DR is positioned rearward, in particular in the horizontal direction x, in the discharge position DP compared to the transport position TP, in particular with reference to the vehicle chassis 2, in particular rearward of a chassisrear CR of the vehicle chassis 2.

Moreover, the drum lift apparatus 4 comprises a rearlift apparatus 7 and a frontlift apparatus 8. The rearlift apparatus 7 and the frontlift apparatus 8 each is adapted to lift, and in particular to lower, at least a part of the concrete drum unit 3 with reference to the vehicle chassis 2. Further, the rearlift apparatus 7 is positioned rearward compared to the frontlift apparatus 8, in particular with reference to the vehicle chassis 2, in particular in the horizontal direction x.

Furthermore, the drum lift apparatus comprises at least one mechanical link 7, 8. The mechanical link 7, 8 is adapted to lift, and in particular to lower, at least a part of the concrete drum unit 3 with reference to the vehicle chassis 2.

In the shown embodiment the rearlift apparatus 7 comprises or is a rearlift mechanical link 7. The frontlift apparatus 8 comprises or is a frontlift mechanical link 8.

Moreover, the vehicle chassis 2, the rearlift apparatus or mechanical link, respectively, 7 a part 16 of the concrete drum unit 3, in particular a platform 16 of the concrete drum unit 3, and the frontlift apparatus or mechanical link, respectively, 8 form a four-bar linkage 9.

This, in particular the drum lift apparatus 4 and/or the four-bar linkage 9, enables to lift and to displace rearwards the concrete drum unit 3, at the same time, and/or to lower and to displace frontwards the concrete drum unit 3, in particular at the same time. Further, this, in particular the drum lift apparatus 4 and/or the four-bar linkage 9, enables to move the concrete drum unit 3 translationally, in particular only translationally and not rotationally.

In alternative embodiments the drum lift apparatus and/or the linkage may be different. In particular the drum lift apparatus may be adapted to move the concrete drum unit additionally or alternatively rotationally. Additionally or alternatively the linkage may be an n-bar linkage. Additionally or alternatively the rearlift apparatus and the frontlift apparatus may be independent from each other, in particular moveable. In particular the rearlift apparatus and the frontlift apparatus each may comprise at least one actuator, in particular a least one hydraulic cylinder, being adapted to lift, and in particular to lower, at least a part of the concrete drum unit with reference to the vehicle chassis.

In detail the rearlift apparatus or mechanical link, respectively, 7 is connected to the vehicle chassis 2 and the concrete drum unit 3, in particular the part or the platform, respectively, 16, at the drumrear DR. The frontlift apparatus or mechanical link, respectively, 8 is connected to the vehicle chassis 2 and the concrete drum unit 3, in particular the part or the platform, respectively, 16, at the drumfront DF.

Furthermore, the drum lift apparatus 4 comprises at least one actuator 10, in particular a least one hydraulic cylinder 10. The at least one actuator 10 is adapted to move at least a part of the concrete drum unit 3, in particular the whole concrete drum unit 3, with reference to the vehicle chassis 2.

In detail the at least one actuator 10 is connected to the vehicle chassis 2 and the concrete drum unit 3, in particular the part or the platform, respectively, 16, at the drumfront DF.

Moreover, the at least one actuator 10 defines the transport position TP, in particular in a retracted state or condition, respectively, of the at least one actuator 10, and the discharge position DP, in particular in an extended state or condition, respectively, of the at least one actuator 10.

The drum lift apparatus 4 may comprise two actuators 10. In alternative embodiments the drum lift apparatus may comprise only one actuator or at least three actuators.

Further, the concrete drum unit 3 comprises a drum drive 11 and a charging hopper 12 and a discharging hopper 13 and a swivel chute 14.

In detail the concrete drum unit 3 comprises the platform 16. The platform 16 carries the concrete drum 5 and the drum drive 11 and the charging hopper 12 and the discharging hopper 13 and the swivel chute 14. The drum lift apparatus 4 is adapted to lift the platform 16 with reference to the vehicle chassis 2 from the transport position TP to the discharge position DP.

This, in particular the drum lift apparatus 4 and/or the four-bar linkage 9, enables, that the swivel chute 14 is lifted and displaced rearwards in the discharge position DP compared to the transport position TP.

In detail the drum drive 11 hold the concrete drum 5 to the platform 16, in particular at the drumfront DF. Furthermore, a shape of the platform 16 corresponds to an outside shape of the concrete drum 5.

Moreover, the drum drive 11 and/or the platform 16, respectively, define/s the drumfront DF.

Further, the charging hopper 12 and/or the discharging hopper 13 and/or the swivel chute 14 and/or the platform 16, respectively, define/s the drumrear DR.

Furthermore, the concrete drum unit 3 defines, in particular the charging hopper 12 and/or the concrete drum 5, respectively, define/s, the vehicle height VH, in the shown embodiment in the discharge position DP. In the shown embodiment the vehicle height VH is defined by a light 19, in particular arranged on top of a driver's cab of the concrete transport vehicle 1, in the transport position TP. In alternative embodiments the concrete drum unit, in particular the charging hopper and/or the concrete drum, respectively, may define the vehicle height in the transport position as well.

Moreover, the concrete drum 5 is a revolving concrete drum.

In the shown embodiment the vehicle height VH is lowered in the transport position TP 30 cm, compared to the discharge position DP.

Further, vehicle height VH is in the transport position TP 235 cm and in the discharge position DP 260 cm.

Furthermore, the drumrear DR and/or the drumfront DF are/is lifted in the discharge position DP 40 cm compared to the transport position TP.

Moreover, an inclination angle IA, in particular between the longitudinal axis LA and the horizontal direction x, of the concrete drum 5 is 16°.

Further, the drumrear DR is positioned rearward in the discharge position DP 40 cm compared to the transport position TP.

Furthermore, a drum volume DV of the concrete drum 5 is 3 $m^3$.

Moreover, the concrete transport vehicle 1 comprises wheels 17. The wheels 17 carry the vehicle chassis 2.

Further, the concrete transport vehicle 1 is a concrete transport truck.

Moreover, the concrete transport vehicle 1 is a mine vehicle.

As the shown and above discussed embodiments reveal, the invention provides a concrete transport vehicle, wherein the concrete transport vehicle comprises improved properties.

The invention claimed is:

1. A concrete transport vehicle, comprising:
a vehicle chassis;
a concrete drum unit; and
a drum lift apparatus,
wherein the vehicle chassis carries the concrete drum unit and the drum lift apparatus,
wherein the concrete drum unit comprises a concrete drum, wherein the concrete drum is adapted to discharge concrete,
wherein the drum lift apparatus is adapted to lift the concrete drum unit with reference to the vehicle chassis from a transport position to a discharge position,
wherein a vehicle height of the concrete transport vehicle is lowered in the transport position compared to the discharge position,
wherein a drumrear and a drumfront of the concrete drum unit each is lifted in the discharge position compared to the transport position,
wherein the drumrear is positioned rearward in the discharge position compared to the transport position and rearward of a chassisrear of the vehicle chassis,
wherein the drum lift apparatus comprises:
a rearlift apparatus comprising a rigid rearlift mechanical link hinged joined to the vehicle chassis and the concrete drum unit at the drumrear and being adapted to lift at least a part of the concrete drum unit at the drumrear with reference to the vehicle chassis,
a frontlift apparatus comprising a rigid frontlift mechanical link hinged joined to the vehicle chassis and the concrete drum unit at the drumfront and being adapted to lift at least a part of the concrete drum at the drumfront with reference to the vehicle chassis, wherein the rearlift mechanical link is positioned rearward compared to the frontlift mechanical link, and
an actuator hinged joined to the vehicle chassis, wherein the vehicle chassis, the rigid rearlift mechanical link, a part of the concrete drum unit and the rigid frontlift mechanical link form a four-bar linkage, in which the vehicle chassis is denoted as ground or frame, the rearlift mechanical link and the frontlift mechanical link each is denoted as a lever or crank, and the part of the concrete drum unit is denoted as a rod or coupler, wherein the actuator is adapted to move the entire four-bar linkage so as to move at least a part of the concrete drum unit with respect to the vehicle chassis.

2. The concrete transport vehicle according to claim 1, wherein
the concrete drum comprises an opening at the drumrear, and
the opening is adapted for discharging concrete out of the concrete drum and for charging concrete into the concrete drum.

3. The concrete transport vehicle according to claim 1, wherein
a longitudinal axis of the concrete drum is inclined in the discharge position and in the transport position.

4. The concrete transport vehicle according to claim 1, wherein
the concrete drum unit comprises a drum drive, a charging hopper, a discharging hopper, and/or a swivel chute.

5. The concrete transport vehicle according to claim 4, wherein
the concrete drum unit comprises a platform,
the platform carries the concrete drum, the drum drive, the charging hopper, the discharging hopper, and/or the swivel chute, and
the drum lift apparatus is adapted to lift the platform with reference to the vehicle chassis from the transport position to the discharge position.

6. The concrete transport vehicle according to claim 1, wherein
the concrete drum is a revolving concrete drum.

7. The concrete transport vehicle according to claim 1, wherein at least one of:
the vehicle height is lowered in the transport position at least 10 cm compared to the discharge position,
the vehicle height in the transport position is in a range from 210 cm to 240 cm, and in the discharge position is in a range from 240 cm to 270 cm, or
the drumrear and/or the drumfront are/is lifted in the discharge position at least 10 cm compared to the transport position.

8. The concrete transport vehicle according to claim 7, wherein at least one of:
an inclination angle of the concrete drum is in a range from 10° to 25°,
the drumrear is positioned rearward in the discharge position at least 10 cm compared to the transport position, or
a drum volume of the concrete drum is in a range from 1 m³ to 6 m³.

9. The concrete transport vehicle according to claim 1, wherein at least one of:
an inclination angle of the concrete drum is in a range from 10° to 25°,
the drumrear is positioned rearward in the discharge position at least 10 cm compared to the transport position, or
a drum volume of the concrete drum is in a range from 1 m³ to 6 m³.

10. The concrete transport vehicle according to claim 1, further comprising:
wheels, wherein the wheels carry the vehicle chassis.

11. The concrete transport vehicle according to claim 10, wherein
the concrete transport vehicle is a concrete transport truck.

12. The concrete transport vehicle according to claim 10, wherein
the concrete transport vehicle is a mine vehicle.

13. The concrete transport vehicle according to claim 1, wherein
the at least one actuator comprises at least one hydraulic cylinder.

14. The concrete transport vehicle according to claim 1, wherein at least one of:
the vehicle height is lowered in the transport position at least 40 cm compared to the discharge position,
the vehicle height in the transport position is 225 cm, and in the discharge position is 260 cm, or
the drumrear and/or the drumfront are/is lifted in the discharge position at least 40 cm compared to the transport position.

15. The concrete transport vehicle according to claim 14, wherein at least one of:
an inclination angle of the concrete drum is 16°,
the drumrear is positioned rearward in the discharge position at least 40 cm compared to the transport position, or
a drum volume of the concrete drum is 3 m³.

* * * * *